May 13, 1924.

W. P. KRAUSE

ROCK OVER MOLDING MACHINE

Filed Nov. 4, 1920   6 Sheets-Sheet 4

1,493,754

Inventor:
William P. Krause,
By Sheridan, Jones, Sheridan & Smith
attys

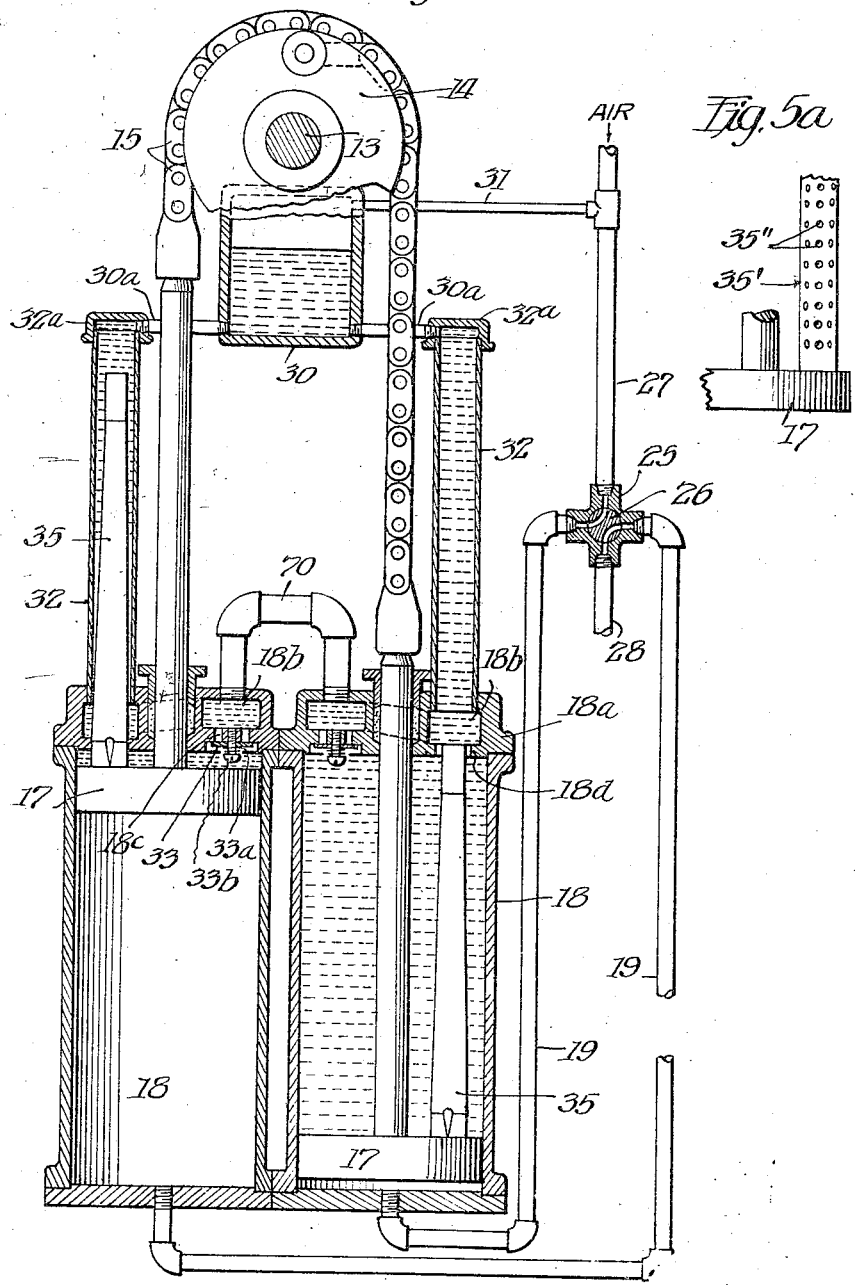

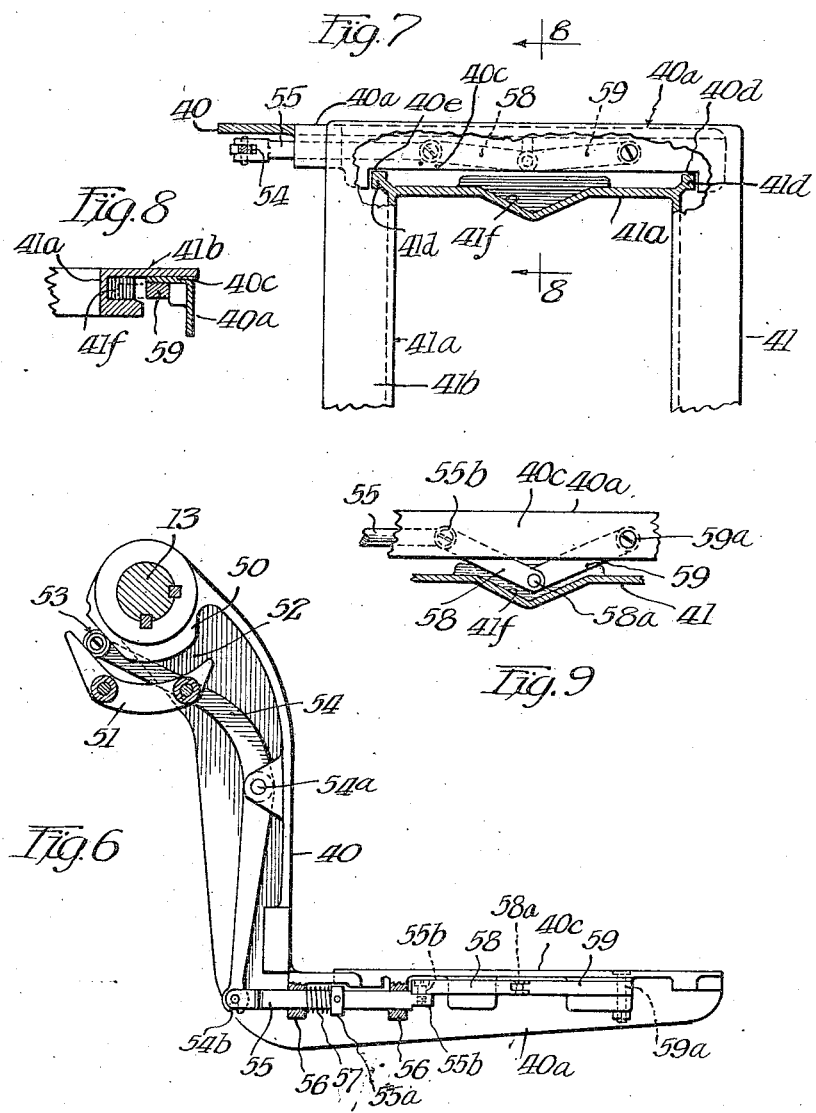

Patented May 13, 1924.

1,493,754

UNITED STATES PATENT OFFICE.

WILLIAM P. KRAUSE, OF CHICAGO, ILLINOIS, ASSIGNOR TO HANNA ENGINEERING WORKS, OF CHICAGO, ILLINOIS, A CORPORATION OF ILLINOIS.

ROCK-OVER MOLDING MACHINE.

Application filed November 4, 1920. Serial No. 421,684.

*To all whom it may concern:*

Be it known that I, WILLIAM P. KRAUSE, a citizen of the United States, residing at Chicago, in the county of Cook and State of Illinois, have invented certain new and useful Improvements in Rock-Over Molding Machines, of which the following is a specification.

This invention relates to improvements in rock-over machines for use in molding operations, and has for its object to provide a new and improved molding machine of that type, in which mechanism is provided to engage a mold-carrying member, rotate and invert the same, and deposit it on a drawing table, which is thereafter actuable to draw the mold from the pattern and lower it for subsequent handling.

My invention resides in the provision of new and improved mechanism to accomplish these and other functions, as will be more fully set forth in the following specification and shown in the accompanying drawings, in which:—

Fig. 5 is a section taken through the operating cylinders, fluid reservoir, etc., the cylinders being shown in parallel relation for clearness;

Figure 1:
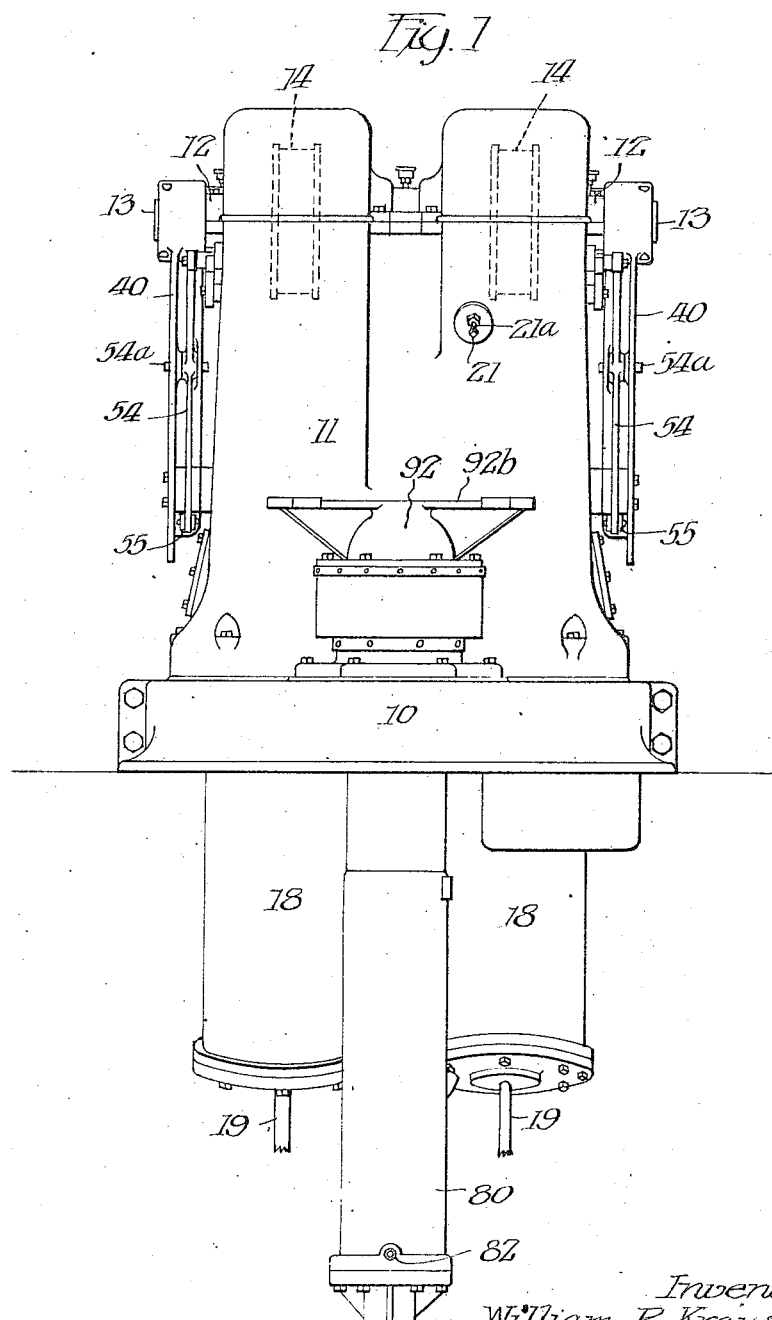
Figure 1 is a front elevation of a machine embodying my invention.

Fig. 5ª is a detail of a modification of the structure shown in Fig. 5;

Fig. 6 is a detail of one of the lifting arms;

Fig. 7 is a plan view, partly in section, of the flask-supporting engaging means;

Fig. 8 is a detail of the same; and

Fig. 9 is a plan view of a detail of the same, showing the mechanism in engaging position.

Like numerals refer to like elements throughout the drawings.

Briefly, my mechanism comprises a pattern carrier and mold support, arms engageable therewith and rotatable about a shaft to move said mold to inverted position and deposit it upon a fluid-actuated withdrawing or drawing table, the arms and shaft being likewise fluid-actuated and operable to handle the mold smoothly after its center of gravity has passed over the vertical.

10 indicates, generally, the base of the machine, from which extends upwardly the casing 11. Bearings 12 are provided, in which is journalled the rotatable shaft 13, to which are secured a pair of sheaves or pulleys 14, normally enclosed by caps 14ª. A flexible chain 15 is secured at 15ª to each pulley, and at its other end is attached at 15ᵇ to the piston rod 16, which is carried by the piston 17. Each piston is reciprocably mounted in the cylinder 18, to which fluid under pressure may be admitted at the bottom through pipe 19, which may act either as a supply or exhaust pipe.

Figure 4:
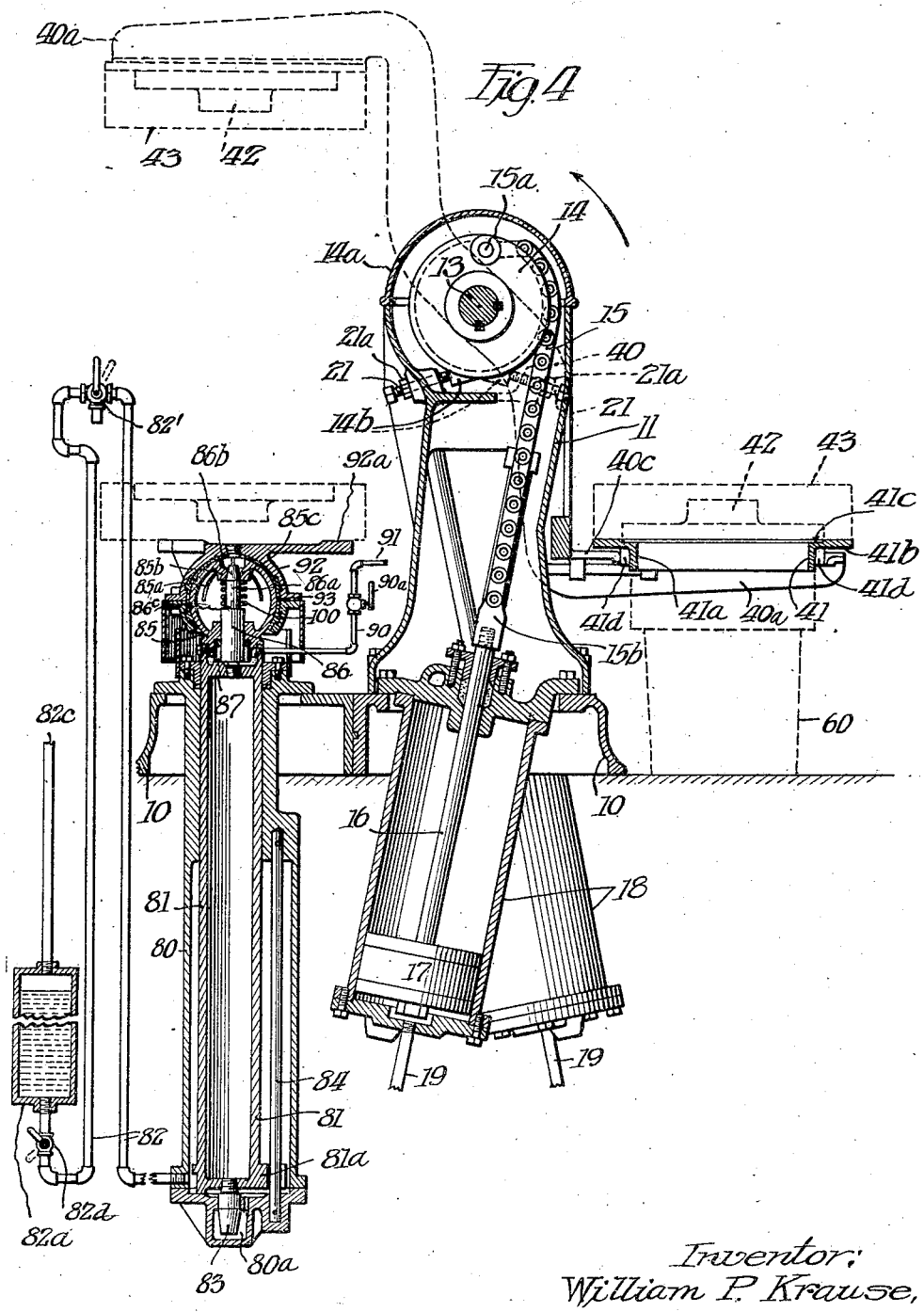
Fig. 4 is a vertical section, taken on the line 4—4 of Fig. 3.

There are a pair of the cylinders 18, their axes being relatively inclined and spaced apart, as shown, for example, in Fig. 4. One of the chains 15 is attached at one side of its pulley 14, while the other is attached at its opposite side, the relative inclination of the cylinders permitting tangential contact of the chains with the respective pulleys, as will be obvious. Each of the pulleys is provided with a lug 14ᵇ adapted to coact with the set screw 21 inserted through a suitable portion of the casing 11 and held in adjusted position by the lock nut 21ª. The two set screws 21 are opposed in their relative relation, as shown in Fig. 1, one serving to stop rotation of the shaft and pulleys in one direction, as will be apparent, thereby limiting the rotative movement of the shaft 13.

Pipes 19 lead from their respective cylinders to a valve casing 25, in which is rotatably mounted the valve 26. An air supply pipe 27 also communicates with the casing 25, and an exhaust pipe 28 leads from said casing. The valve 26 is provided with a passage to throw either of pipes 19 into communication with either of pipes 27 or 28—see Fig. 5. A reservoir 30, containing oil or other suitable fluid, is provided, and an air supply pipe 31 leads from the pipe 27 to the interior of such reservoir, from which lead the outlet pipes 30$^a$. Extending upwardly from the heads 18$^a$ of the cylinders 18 are the sleeves 32, which are closed at their upper extremities by caps 32$^a$ and are in communication with the tubes 30$^a$. The cylinder heads are each provided with a passage 18$^b$, one portion of which is in communication with the sleeve 32 and the other, through a by-pass 18$^c$, with the interior of the cylinder 18, a check valve 33 being provided normally to close the by-pass, being yieldingly held in such position by a coil spring 33$^a$ carried upon the screw 33$^b$. Projecting upwardly from each of the pistons 17 is a tapered rod 35 in alinement with the sleeve 32 and adapted to enter such sleeve, an aperture 18$^d$ being provided for that purpose in the cylinder head 18$^a$. The maximum diameter of each rod 35 is substantially equal to that of the aperture 18$^d$, so that when the piston 17 is in its uppermost position such aperture is substantially closed by the rod 35. During the upward movement of the piston the effective area of the aperture 18$^d$, surrounding the rod 35, greatly decreases, due to the tapered construction of the rod, so that the flow of oil or other fluid from the interior of the cylinder 18 through the aperture 18$^d$ into the passage 18$^b$ is gradually restricted.

In Fig. 5$^a$ I have shown a modification to accomplish the same purpose, which consists in the provision of an upwardly projecting tube 35′ provided with apertures 35″, this tube being adapted to reciprocate in the aperture 18$^d$, and as the tube rises relative to such aperture fewer of the apertures 35″ are available for the passage of oil from the cylinder through the tube 35′, as will be apparent, thereby reducing the cross section available for flow.

Keyed or otherwise suitably secured to the shaft 13 are the arms 40 having angularly bent portions 40$^a$, the arms being shown as constructed of angular cross section—see Figs. 6 and 8, for example.

Located between the angular portions 40$^a$ of the arms is the pattern carrier 41, having the downwardly extending flange 41$^a$ and the horizontal flange 41$^b$, this pattern carrier being recessed at 41$^c$, for example, to permit attachment of a pattern plate carrying a half pattern 42. A cope or drag 43 of a flask will rest upon and be suitably pinned or attached to a portion 41$^b$ against lateral movement. At its corners the carrier 41 is provided with shoulders 41$^d$ outwardly extending, the upper flange 40$^e$ of each of the arms 40 being cut away at 40$^d$ and 40$^e$ to permit accommodation of these shoulders—see Fig. 7.

A stationary cam shoulder 50 is secured to the casing or other stationary part of the mechanism, and spaced therefrom is a second cam 51, a slot 52 being formed between such members, in which ride the rollers 53 carried on the angularly formed arm 54. This arm is pivoted 54$^a$ to the arm 40, and is bifurcated or slotted, as at 54$^b$, at its other extremity to engage a reciprocable rod 55 journalled in the lugs 56 of the arm. A collar 55$^a$ is adjustably secured on the rod 55, and a coiled spring 57 extends between said collar and one of the lugs to normally resist reciprocation to the left of the rod, as viewed in Fig. 6. At its other end the rod 55 is pivotally attached at 55$^b$ to a toggle link 58, which, in turn, is pivoted at its other end to a second coacting toggle link 59, pivoted at 59$^a$ to the arm 40. The carrier 41 is recessed or socketed at 41$^f$ at each side thereof. When the arms rotate with the shaft 13 roller 53 will travel in the slot 52, which is so constructed as to move the lever arm 54 in such wise as to shift the arm 55 to the right, as viewed in Fig. 6. This movement results in the movement of the toggle links 58 and 59 into the socket 41$^f$, thereby locking the carrier 41 to the arms 40 during movement of the latter.

Figure 2:
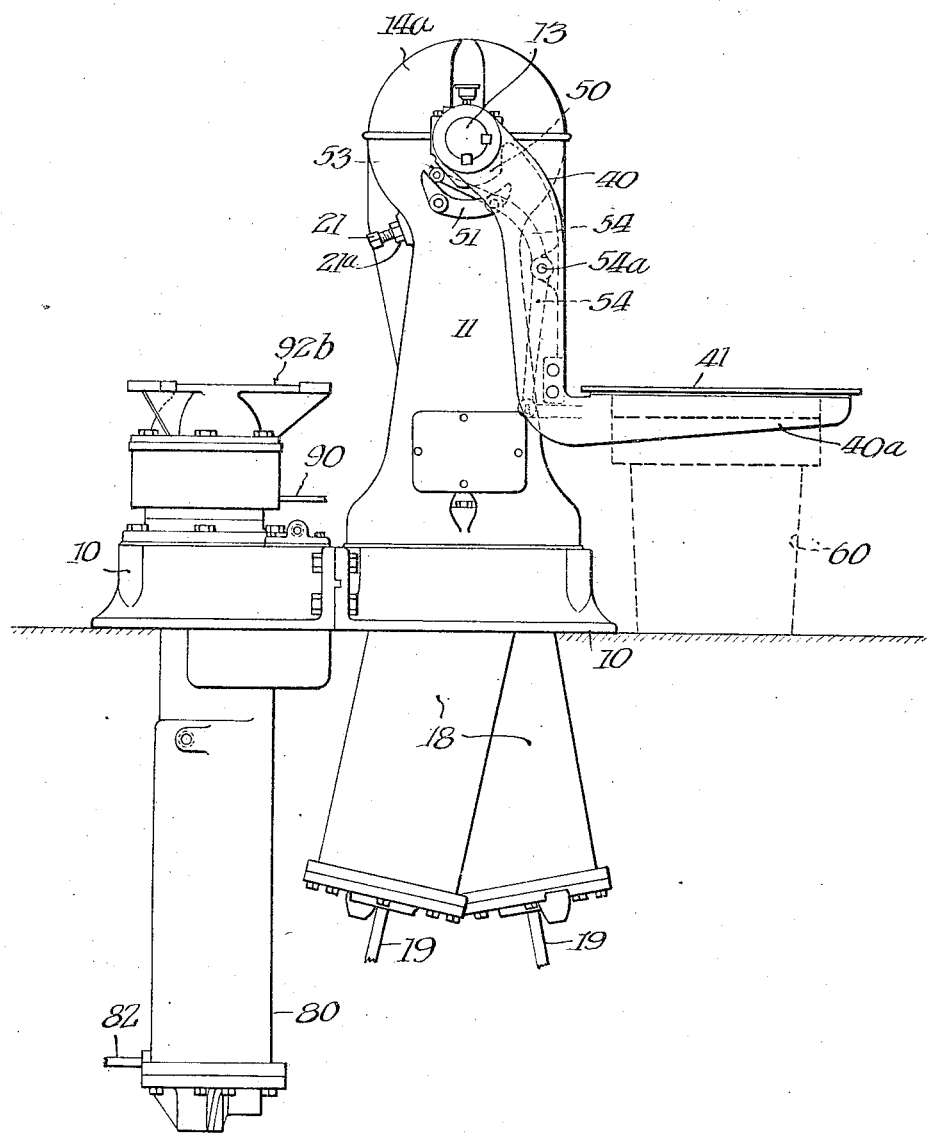
Fig. 2 is a side elevation of the same.
Figure 3:
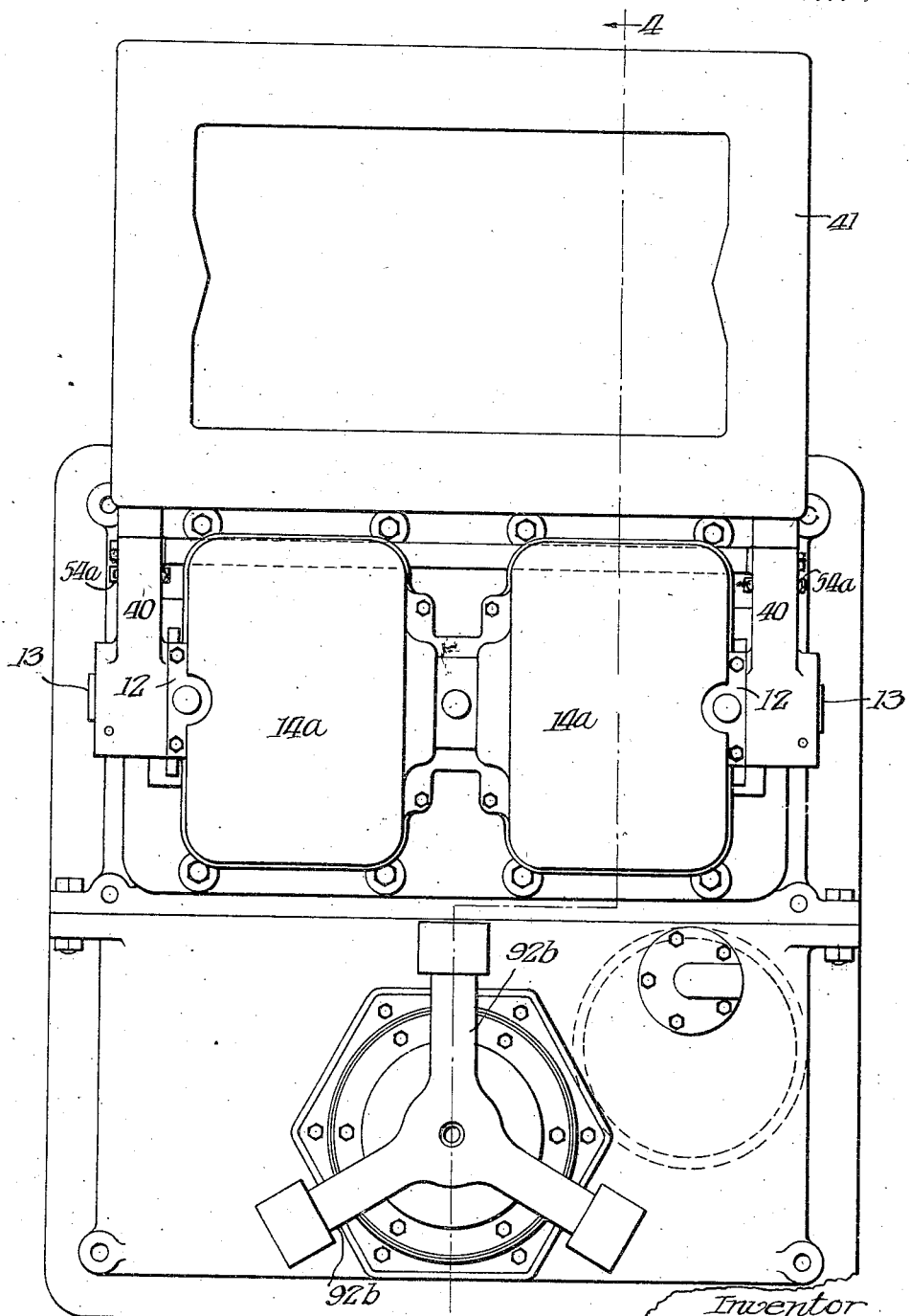
Fig. 3 is a plan view of the same.

A jolt-ramming machine, indicated in outline by the dotted lines in Fig. 2, is designated by numeral 60, this machine being so located as to support the carrier 41 when the arms are in the position shown in Fig. 2. In this position the toggles 58 and 59 are out of engagement with the socket 41$^f$, as shown in Fig. 7, and reciprocation of the carrier by the jolting table of the machine 60 is permitted without interference from the arms 40. After lifting of the carrier starts, however, through the movement of the arms, the toggles move into engagement with the carrier, as described above, and the same is locked to such arms until again returned to the position shown in Fig. 2.

In the actuation of the arms 40, assuming the same to be in the position shown in Fig. 2, the pistons and cylinders will be in the relative arrangement shown in Fig. 5. When the valve 26 is rotated to the position shown in Fig. 5 air will flow through pipe 19 below the right-hand piston 17. The same air pressure obtains in the reservoir 30 through the medium of pipe 31, and the oil in the tubes of sleeves 32, as well as reservoir 30, is under similar pressure. This pressure will be transmitted to the oil in the right-hand cylinder 18, so that the pressure on both sides of the lower piston 17 is equal. The oil may flow, or the pressure thereof be transmitted through the duct 18$^b$ of the right-hand cylinder 18, and through a connecting elbow 70 to the left-hand cylinder duct 18$^b$, as shown in Fig. 5. This oil will flow through the aperture 18$^c$ in the left-hand cylinder, and its pressure will be transmitted to the upper side of the left-hand piston 17. The tube 19 of the left-hand cylinder 18 is in communication with the air pipe 28 and thereby with the atmosphere, so that pressure on the left-hand piston 17 is unbalanced and the oil will function to move the same downwardly. The chain 15 of the left-hand cylinder will transmit rotation to the shaft 13 in a counter clockwise direction, as viewed in Fig. 5. This results in the right-hand piston 17 being drawn upwardy through the medium of its chains. As the rod 35 gradually closes the aperture 18$^d$ this movement will be gradually resisted, the check valve 33 in the right-hand cylinder preventing flow through the passage 18$^c$ during upward movement of the piston.

It will be obvious that when the center of gravity of the arms 40 and mold-supporting member 41 pass over the vertical plane through the axis of the shaft 13, the tendency would be to carry such force of gravity to the force of the downwardly moving piston 17, which would result in a sudden rapidly accelerated downward movement of the mold, etc. This will result in the destruction of the mold and danger to the operators. Such movement is prevented, however, by the restricted area of the aperture 18$^d$ in the right-hand cylinder, which becomes more and more restricted as the rod 35 reaches its predetermined position, thus gradually restricting the flow of oil from the right-hand cylinder 18, and thereby checking the movement of the shaft 13, so that the latter is greatly retarded until gently brought to rest, and a negative rather than a positive acceleration is present.

Mechanism is provided to receive the inverted mold at the conclusion of the movement of the arms 40, i. e. when such arms are in the position indicated in dotted lines in Fig. 4. This mechanism consists of an operating cylinder 80, in which is reciprocably mounted the plunger 81. A fluid inlet and outlet pipe 82 leads from the fluid reservoir 82$^a$ to the bottom of the cylinder. An inlet pipe 82$^c$ leads to the fluid reservoir from a suitable source of supply. A three-way valve 82' is provided to permit flow to and exhaust from said reservoir 82$^a$. The pipe 82$^c$ is provided with a two-way valve 82$^d$. When valve 82' is set to permit flow of air into the reservoir 82$^a$ and valve 82$^d$ is open, the fluid will flow into the cylinder 80 and lift the plunger 81. As it approaches its upper limit of travel, the plunger may be retarded or stopped, and held by operation of valve 82$^d$. Also, its downward movement may be regulated as desired by control of valve 82$^d$. The cylinder is also provided with a dash-pot chamber 80$^a$ at the bottom thereof. A tapered plunger 83 is carried by the main plunger 81 and coacts with the dash-pot 80$^a$ adjacent the lower limit of travel of the plunger to check the same in a well-known manner. The cylinder 80 is enlarged at one side to accommodate a vertically extending rod 84, upon which reciprocates the apertured boss 81$^a$ of the plunger 81, which is thus guided and prevented from rotation.

The plunger 81, at its upper extremity, is provided with a removable head 85, such head being spherical in contour and hollow. The head is provided with slots 85$^a$ leading to a central point at the top of the head, which is strengthened or reinforced by the lug 85$^b$. The latter is provided with a tapered aperture 85$^c$, as shown in Fig. 4, for example. A reciprocable plunger 86 is mounted on the top of the plunger 81 and the head 85, a chamber 87 being provided to accommodate such plunger. A supply pipe 90 leads to the interior of the chamber 87, a valve 90$^a$ being provided to regulate the flow of oil or other actuating fluid through such pipe, which is connected to a source of supply by a flexible hose or the like. The plunger 86 is provided with a reduced portion 86$^a$, which is tapered at its upper extremity 86$^b$ to seat in a tapered aperture 85$^c$, and a spring 100 coacts with a shoulder 86$^c$ to hold said plunger normally in retracted position. When oil or other fluid under pressure is admitted to the chamber 87, the plunger will be raised and its tapered end 86$^b$ will wedge or force apart the orange peel sections of the head 85 formed by the slots 85$^a$. Surrounding the head is a socket 92 lined with babbitt or other anti-friction material. This socket carries a table 92$^a$, which is provided with three outwardly extending arms 92$^b$.

In the operation of the above described mechanism, when the arms have been moved to the position shown in dotted lines in Fig. 4, the mold being held against accidental dropping by means of clamps or the like, ordinarily used for this purpose, the plunger 81 is actuated by means of an operating fluid flowing through pipe 82, its flow being controlled by the valve 82' and 82$^d$, as previously described. The plunger is lifted until the table 92$^a$ contacts with the top of the mold and, assuming the plunger 86 to be in retracted position, the table will adjust itself to the plane or level of the mold automatically, after which self-adjustment the valve 90$^a$ may be actuated and the plunger raised to expand the upper portions of the head 85, in the manner above described. This serves to clamp the head in the socket 92 and secures the table against movement relative to the head. Proper actuation of the valves 82' and 82ᵈ will then permit escape of the fluid in the cylinder 80, through the pipe 82 and the air from reservoir 82ᵃ to the atmosphere, and will also permit the table and mold to be withdrawn from the pattern retained by the arms, the parting being properly made, due to the proper alinement of the table and mold.

After the drawing operation, the arms may be returned to the position shown in Fig. 2, for example, under proper actuation of the valve 26. It will be obvious that during actuation of the rock-over mechanism both chain members 15 are under tension, thereby eliminating the possibility of checks or jerking during the movement of the mold from one position to another.

It will be obvious that my invention is susceptible of numerous modifications and improvements, and I do not, therefore, wish to be restricted to the form shown, except as defined in the appended claims.

I claim:—

1. In apparatus of the class described, rotatable arms, pulleys operatively attached thereto, a pair of cylinders, pistons reciprocably mounted in said cylinders, each of said pistons being operatively attached to one of said pulleys, said pistons and pulleys being so arranged that the pull of one of said pistons upon its pulley will be opposed to the other of said pistons upon its pulley.

2. In a machine of the class described, a rotatable shaft, arms carried thereby, pulleys carried thereby, a pair of cylinders, pistons reciprocable in said cylinders, means to operatively attach each of said pistons to one of said pulleys in such wise that the pull of one piston on said shaft will operate to rotate the latter in one direction and the pull of the other piston will operate to rotate said shaft in the other direction.

3. In a machine of the class described, a rotatable shaft, arms carried thereby, a pair of pulleys secured thereto, a pair of cylinders, pistons reciprocable therein, and flexible members connecting each of said pistons to one of said pulleys.

4. In a machine of the class described, a rotatable shaft, arms carried thereby, a pair of pulleys secured thereto, a pair of cylinders, pistons reciprocable therein, and flexible members connecting each of said pistons to one of said pulleys in such wise that the pull of said pistons upon said pulleys will operate to rotate said shaft in opposite directions.

5. In a machine of the class described, a rotatable shaft, arms carried thereby, a pair of pulleys carried thereby, a pair of cylinders, a piston reciprocating in each of said cylinders, and means operatively connecting each of said pistons to one of said pulleys, the axis of each of said cylinders being substantially tangential to the corresponding pulley.

6. In a machine of the class described, a rotatable shaft, arms carried thereby, a pair of pulleys carried thereby, a pair of cylinders, a piston reciprocating in each of said cylinders, and means operatively connecting each of said pistons to one of said pulleys, the axis of one of said cylinders being substantially tangential to one of said pulleys and the axis of the other cylinder being substantially tangential to the other pulley at the opposite side thereof.

7. In a machine of the class described, a rotatable shaft, pulleys carried thereby, flexible means engaging said pulleys, said means being functionally opposed and actuatable to rotate said shaft in either direction, and means to limit the movement of said shaft in either direction.

8. In a machine of the class described, a rotatable shaft, pulleys carried thereby, flexible means engaging each of said pulleys, said means being functionally opposed and actuatable to rotate said shaft in either direction, and means to limit the movement of said shaft in either direction, said means comprising stop members contactable by said pulleys at their limits of rotation.

9. In a machine of the class described, a rotatable shaft, pulleys carried thereby, one of said pulleys being actuatable to rotate said shaft in one direction, the other pulley being actuatable to rotate said shaft in the opposite direction, each of said pulleys being provided with a lug, and an adjustable set screw contactable by said lug at the limit of travel of the corresponding pulley.

10. In a machine of the class described, a rotatable shaft, pulleys carried thereby, each of said pulleys being provided with a lug and an adjustable set screw contactable by said lug at the limit of travel of said pulleys, one set of said lugs and set screws being arranged to contact on one side of said shaft and the other set to contact on the other side of said shaft.

11. In a machine of the class described, a rotatable shaft, a pair of cylinders, pistons reciprocable therein and operatively attached to said shaft, one of said pistons being arranged to rotate said shaft in one direction and the other to rotate it in the opposite direction, means to actuate one of said pistons to rotate said shaft, and means to resist the movement of the other of said pistons.

12. In a machine of the class described, a rotatable shaft, a pair of cylinders, pistons reciprocable therein and operatively attached to said shaft, one of said pistons being arranged to rotate said shaft in one direction and the other to rotate it in the opposite direction, means to actuate one of said pistons to rotate said shaft, means to resist the movement of the other of said pistons, and means to increase said resistance as said latter piston approaches its limit of travel.

13. In a machine of the class described, a rotatable shaft, a pair of cylinders, pistons reciprocably mounted therein, each of said pistons being operatively attached to said shaft to rotate the same, means to supply actuating fluid under pressure to either of said cylinders, and means to permit escape of air from the other of said cylinders.

14. In a machine of the class described, a rotatable shaft, a pair of cylinders, pistons reciprocably mounted therein, each of said pistons being operatively attached to said shaft to rotate the same, means to supply actuating fluid under pressure to either of said cylinders, means to permit escape of air from the other of said cylinders, and means to permit escape of actuating fluid from said first cylinder to said second cylinder.

15. In a machine of the class described, a rotatable shaft, a pair of cylinders, pistons reciprocably mounted therein, each of said pistons being operatively attached to said shaft to rotate the same, means to supply actuating fluid under pressure to either of said cylinders, means to permit escape of air from the other of said cylinders, means to permit escape of actuating fluid from said first cylinder to said second cylinder, and means to diminish said escape of actuating fluid.

16. In a machine of the class described, a rotatable shaft, a pair of cylinders, pistons reciprocably mounted therein and relatively opposed, said pistons being operatively attached to said shaft, one to rotate the same in one direction and the other in the other direction, means to supply actuating fluid under pressure to either of said cylinders beneath said pistons, and means to supply actuating liquid under pressure to either of said cylinders above said piston.

17. In a machine of the class described, a rotatable shaft, a pair of cylinders, pistons reciprocably mounted therein and relatively opposed, said pistons being operatively attached to said shaft, one to rotate the same in one direction and the other in the other direction, means to supply actuating fluid under pressure to either of said cylinders beneath said pistons, means to supply actuating liquid under pressure to either of said cylinders above said pistons, and means to permit escape of actuating fluid from one of said cylinders when actuating fluid is being supplied to the other thereof.

18. In a machine of the class described, a rotatable shaft, a pair of cylinders, pistons reciprocably mounted therein and relatively opposed, said pistons being operatively attached to said shaft, one to rotate the same in one direction and the other in the other direction, means to supply actuating fluid under pressure to either of said cylinders beneath said pistons, means to supply actuating liquid under pressure to either of said cylinders above said pistons, and means to permit flow of actuating fluid from one of said cylinders to the other cylinder.

19. In a machine of the class described, a rotatable shaft, a pair of cylinders, pistons reciprocably mounted therein and relatively opposed to said pistons being operatively attached to said shaft, one to rotate the same in one direction and the other in the other direction, means to supply actuating fluid under pressure to either of said cylinders beneath said pistons, means to supply actuating liquid under pressure to either of said cylinders above said pistons, means to permit flow of actuating fluid from one of said cylinders to the other cylinder, and means to decrease said flow when said pistons approach their limit of travel in one direction.

20. In a machine of the class described, a rotatable shaft, a pair of cylinders, pistons therein operably attached to said shaft, a liquid supply, means to supply actuating liquid supply, means to permit flow of liquid from said supply to said cylinders at one side of said pistons, and means to supply actuating fluid to said cylinders from the other side of said pistons.

21. In a machine of the class described, a rotatable shaft, a pair of cylinders, pistons reciprocably mounted therein and operably attached thereto, a liquid reservoir, means to convey liquid from said reservoir to said cylinders, means to convey actuating fluid under pressure to said reservoir, means to convey actuating fluid under pressure to said cylinders, means to permit escape of actuating fluid from either of said cylinders, and a valve operable to control the flow and escape of said actuating fluid relative to said cylinders.

22. In a machine of the class described, a rotatable shaft, a pair of cylinders, pistons reciprocable therein and operably attached to said shaft, a liquid reservoir, means to convey liquid from said reservoir to said cylinders, said means comprising sleeves in communication with said cylinders, and means carried by said pistons reciprocable in said sleeves to restrict the flow between said cylinders.

23. In a machine of the class described, a rotatable shaft, a pair of cylinders, pistons reciprocable therein and operably attached to said shaft, a liquid reservoir, means to convey liquid from said reservoir to said cylinders, said means comprising sleeves in communication with said cylinders, and means carried by said pistons reciprocable in said sleeves to gradually decrease the flow as said pistons approach their limit of travel.

24. In a machine of the class described, a rotatable shaft, a pair of cylinders, pistons reciprocable therein and operably attached to said shaft, a liquid reservoir, means to convey liquid from said reservoir to said cylinders, said means comprising sleeves in communication with said cylinders, and means carried by said pistons reciprocable in said sleeves to decrease the flow gradually as said pistons approach their limit of travel, said means comprising a tapered rod.

25. In mechanism of the class described, a rotatable shaft, a pair of cylinders, pistons reciprocable therein and operatively attached to said shaft, a liquid reservoir, means to convey liquid therefrom to said cylinders, and means to convey liquid from one of said cylinders to the other.

26. In mechanism of the class described, a rotatable shaft, a pair of cylinders, pistons reciprocable therein and operatively attached to said shaft, a liquid reservoir, means to convey liquid therefrom to said cylinders, means to convey liquid from one of said cylinders to the other, said means comprising ducts, each of said ducts having an aperture communicating with the interior of said cylinder, and means to close said apertures during one stroke of the corresponding piston.

27. In mechanism of the class described, a rotatable shaft, a pair of cylinders, pistons reciprocable therein and operatively attached to said shaft, a liquid reservoir, means to convey liquid therefrom to said cylinders, means to convey liquid from one of said cylinders to the other, said means comprising ducts, each of said ducts having an aperture communicating with the interior of said cylinder, and means to close said apertures during one stroke of the corresponding piston, said last-named means comprising a check valve.

28. In a machine of the class described, a rotatable shaft, a pair of cylinders, each of said cylinders being provided with a piston operatively attached to said shaft, a liquid reservoir, means to supply liquid therefrom to each of said cylinders, said means comprising sleeves, passage ducts in each of said cylinders having a pair of apertures communicating with the interior of said cylinders, each of said passage ducts being in communication with one of said sleeves and with each other, a valve normally controlling one of each pair of said apertures to prevent flow therethrough from said cylinders, and means carried by each of said pistons to restrict gradually the flow through the other of each pair of said apertures as the corresponding piston approaches its uppermost position.

29. In a machine of the class described, a rotatable shaft, a pair of cylinders, pistons reciprocable therein and operatively attached thereto, a liquid supply reservoir, a pair of sleeves extending upwardly through said cylinders in communication therewith at one end and in communication with said reservoir at the other end, the heads of said cylinders being provided with passage ducts therein in communication with said cylinders, and a duct connecting said passage ducts of said cylinders.

30. In a machine of the class described, a rotatable shaft, a pair of cylinders, pistons reciprocable therein and operatively attached to said shaft, a liquid supply reservoir, liquid ducts leading therefrom to each of said cylinders, said cylinders being provided with passage ducts having a pair of apertures communicating with the interior of said cylinders and being in communication with said liquid supply ducts, a valve for one of each of said pairs of apertures to prevent flow therethrough on the upward travel of the corresponding piston, an air supply line, ducts leading to each of said cylinders, an escape duct, and a valve operable to throw one of said air ducts into communication with said air line and to throw the other of said air ducts into communication simultaneously with said escape duct.

31. In a machine of the class described, a rotatable shaft, a pair of cylinders, pistons reciprocable therein and operatively attached to said shaft, a liquid supply reservoir, liquid ducts leading therefrom to each of said cylinders, said cylinders being provided with passage ducts having a pair of apertures communicating with the interior of said cylinders and being in communication with said liquid supply ducts, a valve for one of each of said pairs of apertures to prevent flow therethrough on the upward travel of the corresponding piston, an air supply line, ducts leading to each of said cylinders, an escape duct, a valve operable to throw one of said air ducts into communication with said air line and to throw the other of said air ducts into communication simultaneously with said escape duct, and means to convey air from said supply line to said liquid reservoir.

32. In a machine of the class described, a rotatable shaft, a pair of spaced apart arms carried thereby, said arms being provided with inwardly extending flanges, and a mold-supporting member carried between said arms and reciprocable relative thereto.

33. In a machine of the class described, a rotatable shaft, a pair of spaced apart arms carried thereby, said arms being provided with inwardly extending flanges, and a mold-supporting member carried between said arms and reciprocable relative thereto, said supporting member being provided with shoulders and the flanges of said arms being cut away to accommodate said shoulders.

34. In a machine of the class described, a rotatable shaft, a pair of spaced apart arms carried thereby, said arms being provided with inwardly extending flanges, a mold-supporting member carried between said arms and reciprocable relative thereto, said supporting member being provided with shoulders and the flanges of said arms being cut away to accommodate said shoulders, and means to lock said carrier to said arms.

35. In a machine of the class described, a rotatable shaft, a pair of spaced apart arms carried thereby, said arms being provided with inwardly extending flanges, a mold-supporting member carried between said arms and reciprocable relative thereto, said supporting member being provided with shoulders and the flanges of said arms being cut away to accommodate said shoulders, and means to lock said carrier to said arms, said last-named means being actuated during rotation of said arms.

36. In a machine of the class described, a rotatable shaft, arms carried thereby, and a mold-carrying member carried between said arms, means to lock said member to said arms, said last-named means comprising a toggle member.

37. In a machine of the class described, a rotatable shaft, arms carried thereby, and a mold-carrying member carried between said arms, means to lock said member to said arms, said last-named means comprising a toggle member and said carrying members being recessed to permit engagement of said toggle member.

38. In a machine of the class described, a rotatable shaft, arms carried thereby, a mold-carrying member carried between said arms, means to lock said member to said arms, said last-named means comprising a toggle member, and means to actuate said toggle member, said means comprising a reciprocable rod and pivoted lever arm and a cam slot, said lever arm being provided with means riding in said slot.

39. In a machine of the class described, a rotatable shaft, spaced arms carried thereby, means to rotate said shaft, said means comprising a pair of cylinders, and pistons reciprocable therein and mutually opposed in their action upon said shaft, one of said pistons being operable to resist movement of said shaft when the other of said pistons is rotating the same, and vice versa.

40. In a machine of the class described, a rotatable shaft, arms carried thereby, means to rotate said shaft, said means comprising a pair of cylinders, pistons reciprocable therein and operatively attached to said shaft, each of said pistons being operable to resist movement of said shaft in one direction and to effect movement thereof in the other direction.

41. In a machine of the class described, drawing mechanism comprising a cylinder, a plunger reciprocable therein, said plunger being provided with a head, a table, said table being provided with a socket rotatable upon said head, said head being provided with expansible portions to engage said table and socket.

42. In a machine of the class described, drawing mechanism comprising a cylinder, a plunger reciprocable therein, said plunger being provided with a head, a table, said table being provided with a socket rotatable upon said head and said head being provided with expansible portions to engage said table and socket.

43. In a machine of the class described, drawing mechanism comprising a cylinder, a plunger reciprocable therein, said plunger being provided with a head, a table, said table being provided with a socket rotatable upon said head and said head being provided with expansible portions to engage said table and socket, said plunger being fluid-actuated.

44. In a machine of the class described, drawing mechanism comprising a cylinder, a plunger reciprocable therein, said plunger being provided with a head, a table, said table being provided with a socket rotatable upon said head and said head being provided with expansible portions to engage said table and socket, means to actuate said expansible portion comprising a plunger being fluid-actuated and provided with a tapered portion and said head with a similarly tapered aperture.

45. In a machine of the class described, drawing mechanism comprising a cylinder, a plunger reciprocable therein, a head carried thereby, a table carried by said head, and means to prevent rotation of said plunger, said means comprising an apertured extension and a guide rod, said extension being reciprocable on said guide rod.

46. In a machine of the class described, drawing mechanism comprising a cylinder, a plunger reciprocable therein, a head carried by said plunger, said head being hollow and slotted to provide expansible portions, a table, said table having a socket carried by said head, and means to expand said expansible portions of said head to engage said head and lock said table in adjusted position.

47. In a machine of the class described, drawing mechanism comprising a cylinder, a plunger reciprocable therein, a table carried by said plunger, said cylinder being provided with a dash-pot, and a coacting plunger carried by said first-named plunger, whereby said main plunger will be gradually brought to rest in approaching its lowermost position.

48. In a machine of the class described, drawing mechanism comprising a cylinder, a plunger reciprocable therein, a fluid pipe leading to said cylinder, a valve in said pipe, a fluid reservoir communicating with said pipe, an air supply pipe communicating with said reservoir, and a three-way valve in said pipe.

In testimony whereof, I have subscribed my name.

WILLIAM P. KRAUSE.